United States Patent
Zhao (10) Patent No.: US 9,977,701 B2
(45) Date of Patent: May 22, 2018

(54) REMOTE COMMUNICATION AND REMOTE PROGRAMMING BY APPLICATION PROGRAMMING INTERFACE

(71) Applicant: Silead Inc., Shanghai (CN)

(72) Inventor: Wenheng Zhao, Shanghai (CN)

(73) Assignee: SILEAD INC., Shanghai (CN)

( * ) Notice: Subject to any disclaimer, the term of this patent is extended or adjusted under 35 U.S.C. 154(b) by 0 days. days.

(21) Appl. No.: 15/297,578

(22) Filed: Oct. 19, 2016

(65) Prior Publication Data

US 2018/0101418 A1  Apr. 12, 2018

(30) Foreign Application Priority Data

Oct. 9, 2016 (CN) .......................... 2016 1 0882465

(51) Int. Cl.
| | | |
|---|---|---|
| H04L 29/12 | (2006.01) | |
| H04L 12/853 | (2013.01) | |
| G06F 9/54 | (2006.01) | |
| H04L 29/06 | (2006.01) | |
| H04L 29/08 | (2006.01) | |
| G06F 9/44 | (2018.01) | |

(52) U.S. Cl.
CPC .............. *G06F 9/54* (2013.01); *G06F 9/4443* (2013.01); *H04L 67/34* (2013.01); *H04L 67/42* (2013.01)

(58) Field of Classification Search
None
See application file for complete search history.

(56) References Cited

U.S. PATENT DOCUMENTS

| | | | | |
|---|---|---|---|---|
| 2002/0103824 A1* | 8/2002 | Koppolu | ........... | G06F 17/30855 715/234 |
| 2015/0095469 A1* | 4/2015 | Kim | ....................... | H04L 61/103 709/220 |
| 2015/0256622 A1* | 9/2015 | Kawazoe | ............ | H04L 67/1097 709/227 |
| 2016/0029420 A1* | 1/2016 | Rajan | .................... | A61B 5/0008 370/329 |
| 2016/0057220 A1* | 2/2016 | Gibbs | ....................... | G06F 8/65 709/203 |

(Continued)

OTHER PUBLICATIONS

Selmeci, "SAP remote communications", May 2012, 7th IEEE International Symposium on Applied Computational Intelligence and Informatics (SACI), pp. 303-309.*

*Primary Examiner* — H S Sough
*Assistant Examiner* — Phuong N Hoang
(74) *Attorney, Agent, or Firm* — Haynes and Boone, LLP (57) ABSTRACT

Methods and systems are provided for Remote Application Programming Interface (RAPI) communications between server and client devices. In an embodiment, server and client devices comprise memories and hardware processors coupled to the memories. The hardware processors execute instructions to perform operations that instantiate access point instances on both server side and client side. The instructions are generated from compiling API interface classes with remote communication classes, wherein the compiling includes a procedure of creating new classes through double inheritance. By receiving an API connection message from a client device, the server device clones a default relayer access point instance and assigns the cloned relayer access point instance to process API requests received thereafter from the client device.

20 Claims, 7 Drawing Sheets

(56) References Cited

U.S. PATENT DOCUMENTS

2016/0072904 A1* 3/2016 Asnis ................. H04L 63/0823
   709/224
2016/0142477 A1* 5/2016 Kawazoe ............ H04L 67/1025
   709/203
2017/0085633 A1* 3/2017 Kim ................... H04L 67/1097

* cited by examiner

REMOTE COMMUNICATION AND REMOTE PROGRAMMING BY APPLICATION PROGRAMMING INTERFACE

PRIORITY

This claims the benefit of Chinese patent application serial No. 201610882465.3, entitled "Remote Communication and Remote Programming by Application Programming Interface," filed Oct. 9, 2016, herein incorporated by reference in its entirety.

BACKGROUND

The present disclosure relates generally to methods and systems for remote communication and remote programming between server and client devices based on Application Programming Interface (API). As used in the present disclosure, remote communication and remote programming through API interface is referred to as Remote API (RAPI).

With the rapid development of Internet of Things (IOT), there has been a growing demand for remote communication and remote programming between application instances running in remote devices. For example, a smart phone device communicates with an outdoor sensor via a network to get temperature information, or a computer device sends parameters to a traffic webcam to adjust lens settings. When two processes are local (e.g. both have access to local machine shared memory), API provides a simple way for process-to-process direct function calls. However, traditional methods do not support remote process-to-process direct function call using API. Neither can pointers for programming be delivered between remote processes.

Therefore, a need exists for systems and methods for simplifying remote direct function calls using API while meeting performance expectations of client-server remote communication and remote programming.

BRIEF SUMMARY

The present disclosure relates to systems and methods for remote communication and programming through API interface between a plurality of server devices and a plurality of client devices. An object of the present disclosure is to provide remote process-to-process direct function call without a need for a central inter-process service register/manager.

According to an embodiment of the present disclosure, a method includes receiving an API interface forward-call header that defines API forward-call functionalities and a communication relayer header that defines remote communication functionalities on a server's end. A compiler creates a first code by compiling at least the API interface forward-call header and the communication relayer header. The method further includes receiving an API interface callback header that defines API callback functionalities and a communication client header that defines remote communication functionalities on a client's end. The compiler creates a second code by compiling at least the API interface callback header with the communication client header. The first code and the second code are stored in a memory of a server device. Executing the first code by processors of the server device creates a relayer access point instance that is associated with a default relayer identifier. The relayer access point instance receives an API connection message that contains a relayer identifier matching the default relayer identifier. The method also creates a cloned relayer access point instance for processing an API service message received thereafter. Processors of the server device further execute the second code to create a client callback access point instance if the API connection message contains a callback channel connection request.

In an embodiment, a method includes constructing a client application instance within a memory of a client device and constructing a client access point instance associated with the client application instance. The client access point instance is created by executing code compiled from at least an API interface forward-call header and a communication client header. The client access point instance creates and transmits an API connection message, which contains a relayer identifier. The client access point instance also creates an API service message and transmits it, which contains the same relayer identifier.

In a further embodiment, besides client access point instance, a relayer callback access point instance is constructed by executing another code complied from at least an API interface callback header and a communication relayer header. The API interface forward-call header and the API interface callback header both inherit from a parent API interface class that defines common API interface functionalities. The communication client header and the communication relayer header both inherit from a parent communication class that defines common communication functionalities. The relayer callback access point instance receives an API result message from a server device networked to the client device.

According to another aspect of the present disclosure, a method for an API communication between a server and a client is disclosed. The method includes receiving an interface user-defined function set and a common template set. Four access point instances are created by compiling the interface user-defined function set and the common template set. Two access point instances are instantiated in the server, and two access point instances are instantiated in the client. Each access point instance has an inheritance from at least one file from the interface user-defined function set and one file from the common template set. Further, the compiling includes a procedure of a class double inheritance. The two access point instances in the client handle creating and transmitting an API connection message as well as an API service message, and receiving an API result message thereafter. Some identifiers are associated with the API messages to identify sender and recipient. The two access point instances in the server handle receiving the API connection message and the API service message, and creating and transmitting the API result message thereafter. A cloned access point instance is also created in the server to process API service requests contained in the API service message.

It is to be understood that both the foregoing general description and the following detailed description are exemplary and explanatory in nature and are intended to provide an understanding of the present disclosure without limiting the scope of the present disclosure. In that regard, additional aspects, features, and advantages of the present disclosure will be apparent to one having ordinary skill in the art from the following detailed description.

BRIEF DESCRIPTION OF THE DRAWINGS

The accompanied drawings illustrate embodiments of the systems and methods disclosed herein and together with the description, serve to explain the principles of the present disclosure.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, the features, components, and/or steps described with respect to one embodiment may be combined with the features, components, and/or steps described with respect to other embodiments of the present disclosure to form yet another embodiment of device, system, or method according to the present disclosure even though such a combination is not explicitly shown. Further, for the sake of simplicity, in some instances the same reference numerals are used throughout the drawings to refer to the same or like parts.

Figure 1:
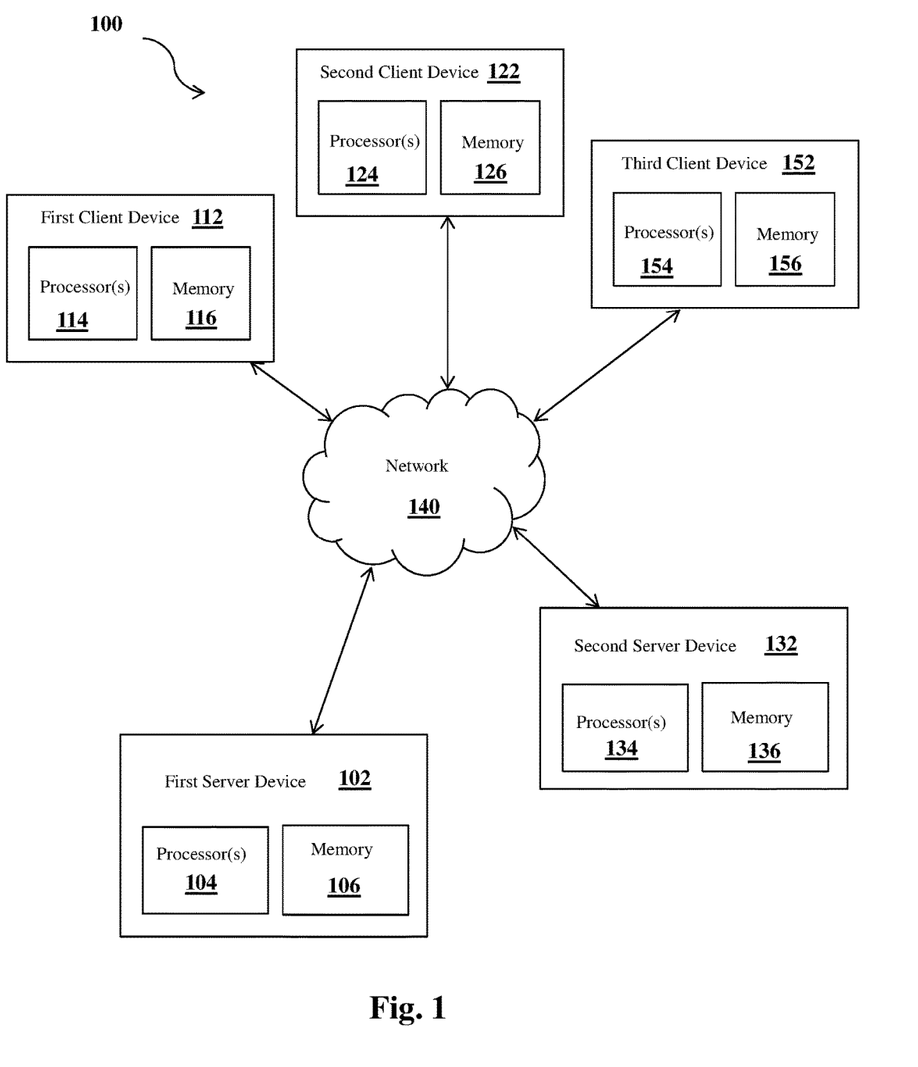
FIG. 1 is an organizational diagram illustrating a remote communication system, in accordance with various embodiments of the present disclosure.

FIG. 1 is an organizational diagram illustrating a remote communication system 100, in which various aspects of the present disclosure may be implemented.

The remote communication system 100 includes various components interconnected through a network. More specifically, the system 100 includes client devices, such as a first client device 112, a second client device 122, and a third client device 152. The system 100 also includes server devices, such as a first server device 102 and a second server device 132. In various examples there may be less or extra client devices and less or extra server devices. The components 102, 112, 122, 132, and 152 are interconnected through a network 140.

The network 140 may include one or more sub-networks. For example, first client device 112, second client device 122, and third client device 152 may be connected to first server device 102 and second server device 132 via one or more internet networks, while first server device 102 and second server device 132 are connected via one or more intranet networks. The network 140 may include any combination of public and/or private networks. The network 140 may include a plurality of network devices and transport media that are communicatively coupled via transport media. In some examples, network devices may include hubs, routers, switches, and so forth. In some examples, transport media may include Ethernet cable, Fibre Channel Cable, wireless signals, and so forth. In the present example, the network 140 is structured to route communication messages between the client devices and the server devices via protocols that support socket, such as Universal Asynchronous Receiver/Transmitter (UART), Universal Serial BUS (USB), Transport Control Protocol/Internet Protocol (TCP/IP), and Wireless Local Area Network (WLAN). The client devices and the server devices may each include a network interface component (not shown) that is structured to communicatively couple the respective devices 102, 112, 122, 132, and 152 to the network 140. In some examples, a network interface component may include a network interface card or other hardware and/or software component that allows client devices and server devices to connect to network 140.

Still referring to FIG. 1, each of the components 102, 112, 122, 132, and 152 includes one or more processors and a memory. More specifically, first server device 102 includes one or more processors 104 and a memory 106; second server device 132 includes one or more processors 134 and a memory 136; first client device 112 includes one or more processors 114 and a memory 116; second client device 122 includes one or more processors 124 and a memory 126; and third client device 152 includes one or more processors 154 and a memory 156. In an embodiment, first client device 112 and first server device 102 physically reside in one device. To further this embodiment, the processors 104 and 114 may be the same processor, and the memories 106 and 116 may be the same memory media. In another embodiment of the system 100, second server device 132, second client device 122, and third client device 152 may be omitted. The various components of server devices and client devices are further described in details below.

The client devices 112, 122, and 152, in some embodiments, are mobile devices such as mobile phones or smart phones. The client devices 112, 122, and 152 may be other types of mobile devices such as personal digital assistants (PDA) or tablets in various embodiments. The client devices 112, 122, and 152, in some other embodiments, are computing devices such as personal computers (PC), workstations, or other computing devices. The client devices 112, 122, and 152 may be a combination of different types of mobile devices and computing devices. For example, first client device 112 is a smart phone in the present embodiment. First client device 112 performs specific operations by processors 114 and other components (not shown) by executing one or more sequences of software codes contained in memory 116. Software codes (or code) may also be referred to as instructions. The terms of "code" and "instructions" may refer to one or more software applications, programs, routines, sub-routines, functions, procedures, etc. "Code" and "instructions" may include a single computer-readable statement or many computer-readable statements.

In an embodiment, each of the processors 104, 114, 124, 134, and 154 represents one or more general-purpose processing devices such as a microprocessor, central processing unit, or the like. In more detail, each processor 104, 114, 124, 134, or 154 may be one or more special-purpose processing devices such as an application specific integrated circuit (ASIC), a field programmable gate array (FPGA), a digital signal processor (DSP), network processor, or the like. Each processor 104, 114, 124, 134, or 154 may also be a complex instruction set computing (CISC) microprocessor, reduced instruction set computing (RISC) microprocessor, very long instruction word (VLIW) microprocessor, or a processor implementing other instruction sets or processors implementing a combination of instruction sets. Each of the processors 104, 114, 124, 134, and 154 is configured to execute instructions for performing the operations and steps discussed herein.

In an embodiment, each of the memories 106, 116, 126, 136, and 156 represents a main memory (e.g., read-only memory (ROM), flash memory, dynamic random access memory (DRAM) such as synchronous DRAM (SDRAM), double data rate SDRAM (DDR SDRAM), or Rambus DRAM (RDRAM), and so forth), static memory (e.g., flash memory, static random access memory (SRAM), and so forth), and/or data storage device. Each of the memories 106, 116, 126, 136, and 156 may include a computer-readable storage medium on which one or more sets of instructions are stored embodying any one or more of the methodologies or functions described herein. The instructions may reside, completely or at least partially, within each of the memories 106, 116, 126, 136, and 156 and/or within each of the processors 104, 114, 124, 134, and 154 during execution of the instructions by each processor. The instructions may further be transmitted or received over a network via a network interface device.

The term "computer-readable storage medium," as used above, may refer to any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media. While memories 106, 116, 126, 136, and 156 are shown in an example to be a single medium, the term "medium" should be taken to include a single medium or multiple media (e.g., a centralized or distributed database, and/or associated caches and servers) that stores the one or more sets of instructions.

In an embodiment, server devices 102 and 132 may be a PC, a tablet, a PDA, a mobile phone, a web appliance (e.g. a webcam), a server, a network router, or any one or more machines capable of executing a set of instructions that specify actions to be taken by the server devices. Each server device 102 or 132 performs specific operations by the processors 104 or 134 and other components (not shown) by executing one or more sequences of instructions contained in memory 106 or 136. While for each server device 102 or 132, a single device is illustrated, the term "device" shall also be taken to include any collection of devices that individually or jointly execute a set (or multiple sets) of instruction to perform any one or more of the methodologies discussed herein. Thus, each server device 102 or 132 may include a single device or multiple devices arranged in a cluster.

Each of the server devices 102 and 132 enables access from client devices 112, 122, and 152 to server applications stored on each of the server devices 102 and 132. The server applications provide API interfaces for client devices to communicate with or to program server application parameters. Through such API interfaces, the client devices get access to a shared collection of computing resources including cloud storage and application services related to the server devices. For example, first server device 102 may be a webcam that has a set of remote camera services defined in a webcam application running in first server device 102. The webcam application has an API interface for a client device to query stored images in the memory 106 or to request camera actions such as taking time lapse photos in a defined interval.

Figure 2:
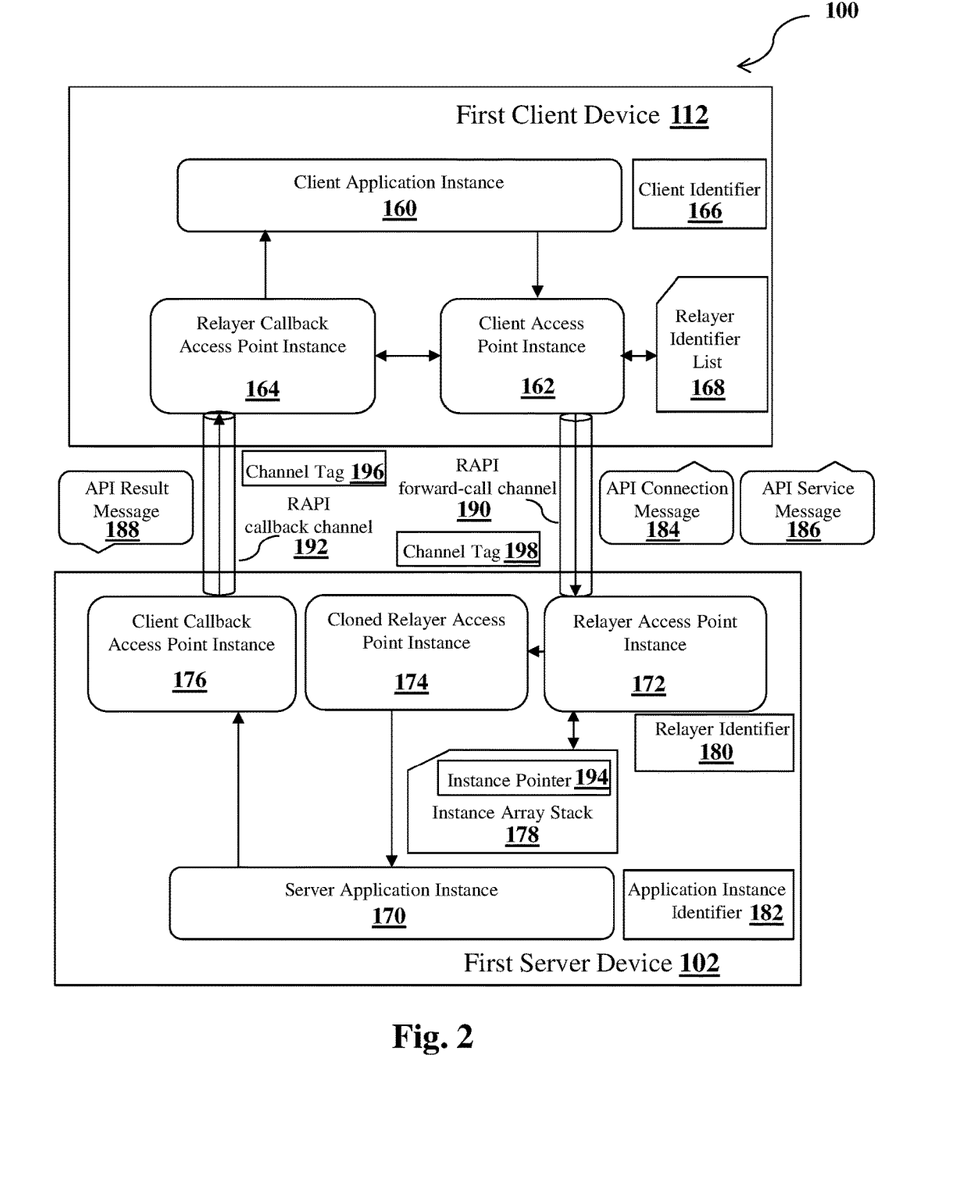
FIG. 2 illustrates various instances, files, and data flows that may be implemented by the system of FIG. 1 for delivering messages among access point instances of a client device and a server device, in accordance with an embodiment.

FIG. 2 illustrates various instances (or programs, or applications), files, and data flows that may be implemented by various components of remote communication system 100. Specifically, FIG. 2 illustrates client device 112 and server device 102 in remote communication system 100, in accordance with the present embodiment. In various embodiments, client device 112 and server device 102 may operate in client-server network environment, or as peer devices in a peer-to-peer (e.g., distributed) network environment. In an embodiment, the connection between client device 112 and server device 102 may be a local machine shared memory internal to server device 102, for example, when client device 112 and server device 102 are physically one device. In various embodiments, an instance may be implemented as a sequence of instructions stored in a memory such as the memories 106, 116, 126, 136, and 156 and executable by processors such as processors 104, 114, 124, 134, and 154. In various embodiments, a file is structured to store contents that may be processed (e.g., read and/or written) by an instance, which may include all or portions of relational databases, flat files, web services, and so forth. Data flow refers to communication between two or more components of system 100 through network 140. The various modules, files, and data flows of system 100 are collectively discussed below with references to FIG. 2.

Figure 3:
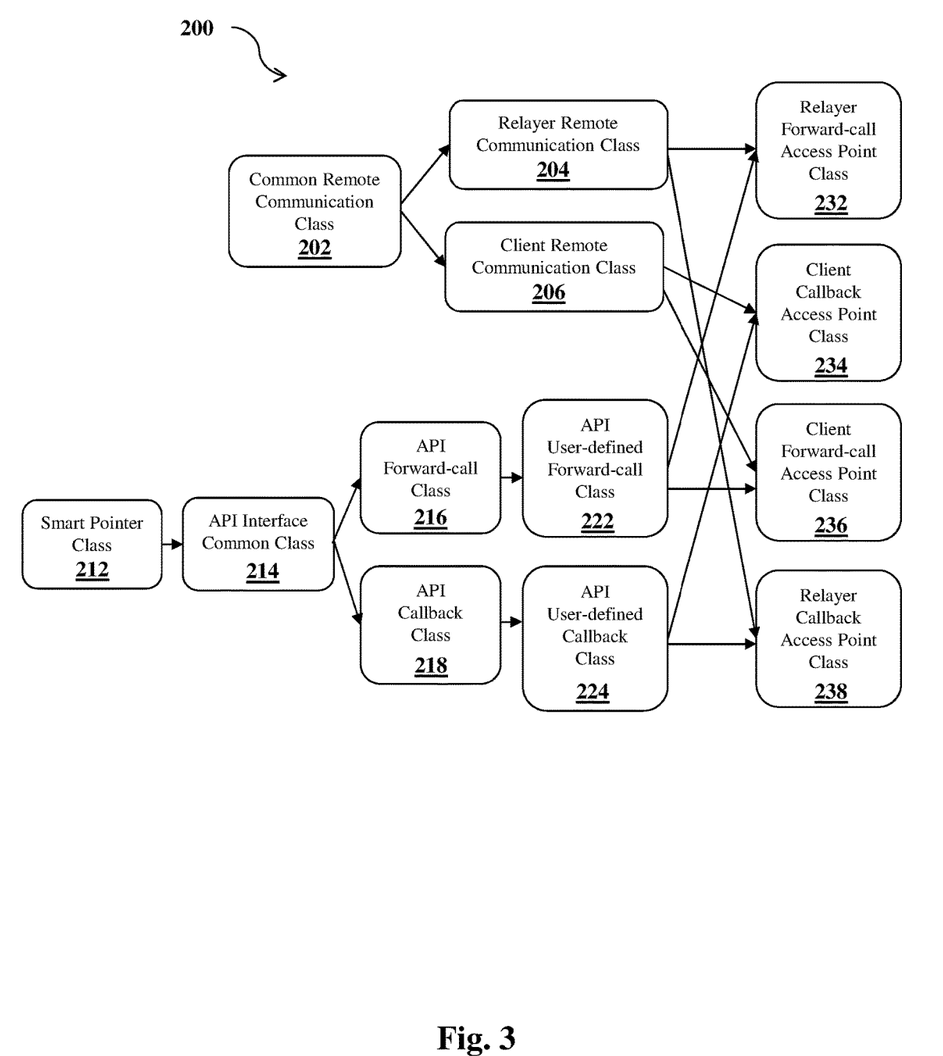
FIG. 3 illustrates an exemplary Foundation Classes Set and inheritance relationships among classes that may be implemented by the system of FIG. 1, in accordance with the present embodiment.

Referring to FIG. 2, client device 112 includes or implements a client application instance 160 running in memory 116. When client application instance 160 is instantiated, it is associated with a client identifier 166. Client application instances instantiated in different client devices may be associated with different client identifiers. In an embodiment, when client application instance 160 is re-instantiated in the same client device (e.g. after a client device reboot), the same client identifier 166 will be assigned. Yet in another embodiment, each time client application instance 160 is instantiated, a different client identifier 166 will be created and associated with client application instance 160, even in the same client device. Client device 112 further includes or implements a client access point instance 162. From object-oriented program's aspect, client access point instance 162 is an object built from a specific class defined in an object-oriented programming. Specifically, client access point instance 162 is an object built from a client forward-call access point class 236 (FIG. 3). The definition of a client forward-call access point class and other access point classes will be described later with references to FIG. 3.

Still referring to FIG. 2, client access point instance 162 has two functionalities, one is performing API interface forward-call with client application instance 160 though an API interface between client application instance 160 and client access point instance 162, another is performing client-initiated communication with a server device through network 140 or through local machine shared memory if client device 112 and server device 102 are physically one device.

In the present embodiment, client device 112 includes or implements a relayer callback access point instance 164. A relayer is a part of a server device for processing RAPI communications. A relayer callback access point instance is inside a client device to receive callbacks from a relayer in a server device. Relayer callback access point instance 164 (or server callback access point instance 164) is an object built from relayer callback access point class 238 (FIG. 3) defined in an object-oriented programming. Relayer callback access point instance 164 has two functionalities, one is performing API interface callback with a client application instance 160 though an API interface between client application instance 160 and relayer callback access point instance 164, another is performing relayer-initiated communication with a client device through network 140 or through local machine shared memory if client device 112 and server device 102 are physically one device.

In one embodiment, client device 112 does not implement a relayer callback access point instance 164. This happens when client device 112 does not need to receive a callback service from a server device. For example, server device 102 may be a webcam for traffic monitoring, and client device 112 needs to send a set of webcam lens exposure settings to server device 102 for programming the webcam's parameters but does not need to retrieve any image from memory 106 of server device 102. As a callback service is not needed in this situation, client device 112 can skip the implementation of a relayer callback access point instance 164.

Still referring to FIG. 2, server device 102 includes or implements a server application instance 170 running in memory 106. When server application instance 170 is instantiated, it is associated with an application instance identifier 182. Server application instances instantiated in different server devices may be associated with different application instance identifiers. Server device 102 further includes or implements a relayer access point instance 172. Relayer access point instance 172 (or server access point instance 172) is an object built from a specific class defined in an object-oriented programming. Specifically, relayer access point instance 172 is an object built from a relayer forward-call access point class 232 (FIG. 3). When relayer access point instance 172 is instantiated, it is associated with a relayer identifier 180. In the present embodiment, relayer identifier 180 is unique for each server device and remains unchanged even when a server device reboots. Therefore, relayer identifier 180 can also serve as an identifier to differentiate a server device from other server devices connected to network 140. Client device 112 stores a relayer identifier list 168 in its memory 116. This list 168 includes values of relayer identifier 180 from different server devices. Client application instance 160 selects from relayer identifier list 168 a relayer identifier 180 corresponding to a targeted server device to initiate a RAPI communication. In one embodiment, application instance identifier 182 is different from relayer identifier 180. A new application instance identifier 182 is generated every time server application instance 170 is re-instantiated (e.g. after the server device 102 reboot). Yet in another embodiment, relayer identifier 180 is also used as the value for application instance identifier 182, which becomes a constant in this case.

Relayer access point instance 172 has two functionalities, one is performing API interface forward-call with server application instance 170 though an API interface, another is performing remote communication to receive client-initiated communication through network 140 or through local machine shared memory if client device 112 and server device 102 are physically one device. Relayer access point instance 172 and client access point instance 162 together define two ends of an RAPI forward-call channel between server device 102 and client device 112.

To initiate an RAPI communication, client access point instance 162 creates an API connection message 184. API connection message 184 includes client identifier 166 and a relayer identifier corresponding to a server device to communicate with, which is retrieved from relayer identifier list 168. If client application instance 160 expects callback services, API connection message 184 further includes a callback channel connection request. Client access point instance 162 then sends out API connection message 184.

After relayer access point instance 172 in server device 102 receives API connection message 184, the relayer identifier in API connection message 184 is retrieved and compared with server device 102's own relayer identifier 180. If the two relayer identifiers do not match, it may indicate that server 102 is not the targeted recipient of API connection message 184, and relayer access point instance 172 will discard API connection message 184. If the two relayer identifiers match, relayer access point instance 172 will accept API connection message 184 and further retrieve client identifier 166. Then relayer access point instance 172 will search an instance array stack 178 with the received client identifier 166. Instance array stack 178 has a history of previously received client identifiers. If the history shows client identifier 166 has not been received before, relayer access point instance 172 will duplicate itself in memory 106 to create a cloned relayer access point instance 174. Cloned relayer access point instance 174 inherits all the functionalities of relayer access point instance 172 and is assigned to handle future communications solely associated with the same client identifier. Meanwhile, an instance pointer 194 associated with client identifier 166 will be pointed to cloned relayer access point instance 174 and stored in instance array stack 178. By examining the existence of instance pointer 194 in instance array stack 178, relayer access point instance 172 can know whether client identifier 166 has been received before.

In the present embodiment, API connection message 184 contains a callback channel connection request which indicates that client device 112 expects callback services and a relayer callback access point instance 164 has been instantiated in memory 116 of client device 112. Server device 102 correspondingly implements a client callback access point instance 176. Client callback access point instance 176 is an object built from a specific class defined in an object-oriented programming. Specifically, client callback access point instance 176 is an object built from a client callback access point class 234 (FIG. 3). When client callback access point instance 176 is instantiated, it is associated with the received client identifier 166. Client callback access point instance 176 has two functionalities, one is performing API interface callback with server application instance 170 though an API interface, another is performing relayer-initiated communication with a client device through network 140 or through local machine shared memory if client device 112 and server device 102 are physically one device. Client callback access point instance 176 and relayer callback access point instance 164 together define two ends of an RAPI callback channel 192 between server device 102 and client device 112. In one embodiment, server device 102 does not implement a client callback access point instance 176 when there is no callback channel connection request contained in API connection message 184, which indicates that client device does not expect any callback services.

In the present embodiment, relayer access point instance 172 and client access point instance 162 together uniquely define an RAPI forward-call channel 190 from client device 112 to server device 102. Client callback access point instance 176 and relayer callback access point instance 164 together uniquely define an RAPI callback channel 192 from server device 102 to client device 112. These two RAPI channels 190 and 192 are the private communication channels for client device 112. The other client devices, such as client device 122 and client device 152, to communicate with server device 102, will have to setup their own corresponding RAPI channels. The creation of private communication channels for client devices allows multiple client devices to communicate with a server device at the same time without causing jamming or conflicts. As access point instances and corresponding RAPI channels handle API interface and remote communication operations and hide RAPI communication details from application instances, from application instances' aspect, client application instance 160 and server application instance 170 are as if having direct communications with each other, more specifically as if having process-to-process direct function calls locally.

Each RAPI channel, such as RAPI forward-call channel 190 and RAPI callback channel 192, can be associated with a unique channel tag, respectively channel tag 196 and channel tag 198. Each channel tag may include information from one or more of client identifier 166, relayer identifier 180, application instance identifier 182, and forward-call/callback direction. Channel tags 196 and 198 are stored in a non-transitory memory in memory 106. In one embodiment, channel tags 196 and 198 are stored in a non-transitory memory in memory 116 of client device 112, as well.

When a reboot happens to server device 102, for example, due to processors 104 or memory 106 malfunctions, or due to a power outage, server device 102 can retrieve information from its memory 106 about the stored instance array stack 178 and channel tags, such as channel tags 196 and 198 for client device 112. This information allows server device 102 to acquire the knowledge of RAPI communication channels setup with client devices and re-instantiate access point instances, such as relayer access point instance 172, cloned relayer access point instance 174, and client callback access point instance 176 with associated relayer identifier 180, application instance identifier 182, and client identifier 166. The already setup RAPI communication channels would therefore not be affected. This reboot on server side is therefore invisible to client device 112.

When a reboot happens to client device 112, client application instance 160, after re-instantiation in memory 116, may be assigned a same client identifier 166. Client access point instance 162 and relayer callback access point instance 164, if callback service is needed, will be re-instantiated with the same client identifier 166 as before the reboot. In this way, there would be no changes to the RAPI communication channels setup. This reboot on client side is therefore invisible to server device 102. In one embodiment, after client device 112's reboot, a new client identifier 166 may be generated. Therefore, when server device 102's relayer access point instance 172 receives an API connection message 184, it will duplicate a new cloned client relayer access point instance 174 associated with the new client identifier 166. Also a new client callback access point instance 176, if callback service is needed, will be instantiated. Instance array stack 178 will be updated accordingly. Two new channel tags 196 and 198 will be stored. Server device 102 will therefore setup a pair of new RAPI communication channels as if client device 112 appears as a new client device.

FIG. 3 illustrates an exemplary Foundation Classes Set and inheritance relationships among classes that may be implemented by the remote communication system of FIG. 1, in accordance with the present embodiment. Relayer access point instance 172 is an object instantiated from relayer forward-call access point class 232, client callback access point instance 176 is an object instantiated from client callback access point class 234, client access point instance 162 is an object instantiated from client forward-call access point class 236, and relayer callback access point instance 164 is an object instantiated from relayer callback access point class 238. Each access point class 232, 234, 236, or 238 includes functions of two categories, one is API interface functions, and another is remote communication functions. Each access point class's corresponding access point instance 172, 176, 162, or 164 thus exhibits dual functionalities for handling communication with application instance through API interface and handling remote communication with remote devices. Dual functionalities are acquired from class double inheritance. Each arrow represents a class inheritance in FIG. 3.

If each access point class needs manually defined by a programmer, it can be a burden. Foundation Classes Set can hide nuance of common functions and allow a programmer to focus on defining specific functions for different service applications. Common remote communication class 202 defines a root class for remote communication common functions, public variables, and client/relayer side function prototypes as default implementations. Relayer remote communication class 204 inherits from common remote communication class 202 and further defines specific remote communication functions that handle relayer side remote communication events. Client remote communication class 206 also inherits from common remote communication class 202 and further defines specific remote communication functions that handle client side remote communication events. Smart pointer class 212 is a root class with definitions of smart pointer implementation. Smart pointer is for flagging the existence of objects. When an object is deleted, another application's reference pointer can detect that this object no longer exists. Or when an object has been deleted while the same memory is assigned a new object of a same class, another application's reference pointer which is supposed to point to the original object can detect that the original object no longer exists, although a valid object exists in the same memory. API interface common class 214 inherits from smart pointer class 212. API interface common class 214 also defines a root class for API interface common functions and common variables. API forward-call class 216 inherits from API interface common class 214 and further defines specific API interface functions that handle forward-call events. API callback class 218 inherits from API interface common class 214 and further defines specific API interface functions that handle callback events. Classes 202, 204, 206, 212, 214, 216, and 218 are part of a Foundation Classes Set.

Still referring to FIG. 3, API user-defined forward-call class 222 inherits from API forward-call class 216, wherein it inherits the API Interface common functions and API forward-call functions from its parent classes two levels up and also further defines application specific API forward-call functions. API user-defined callback class 224 inherits from API callback class 224, wherein it inherits the API Interface common functions and API callback functions from its parent classes two levels up and also further defines application specific API callback functions. API user-defined forward-call class 222 and API user-defined callback class 224 may be the only input needed from a programmer. Foundation Classes Set contains all common functions for API interface and remote communication, which every application can use and thus no need to be differentiated. A programmer only needs to specify specific API interface functions used by unique applications. For example, a webcam system with webcam service application instance running has its own API interface forward-call functions and callback functions, which are defined in API user-defined forward-call class 222 and API user-defined callback class 224, respectively. A fingerprint examination system with a fingerprint examination application instance running also has its own specific API interface forward-call functions and callback functions according to its own demand of a fingerprint examination application. But both webcam system and fingerprint examination system can use the same classes 202, 204, 206, 212, 214, 216, and 218 for handling API interface and remote communication common functionalities. Foundation Classes Set can be provided to a programmer as a whole for compiling and hide implementation details, while the programmer only needs to focus on specifying unique API interface functions used by different service applications.

Still referring to FIG. 3, relayer forward-call access point class 232 has a double inheritance from relayer remote communication class 204 and API user-defined forward-call class. A double inheritance is a child class to inherit from two different parent classes and acquire functionalities from both parent classes. As a result, relayer forward-call access point class 232 inherits relayer-side remote communication capability from relayer remote communication class 204 and API forward-call capability from API user-defined forward-call class 222. Similarly, client callback access point class 234 inherits client-side remote communication capability from client remote communication class 206 and API callback capability from API user-defined callback class 224. Client forward-call access point class 236 inherits client-side remote communication capability from client remote communication class 206 and API forward-call capability from API user-defined forward-call class 222. Relayer callback access point class 238 inherits relayer-side remote communication capability from relayer remote communication class 204 and API callback capability from API user-defined callback class 224.

Figure 4:
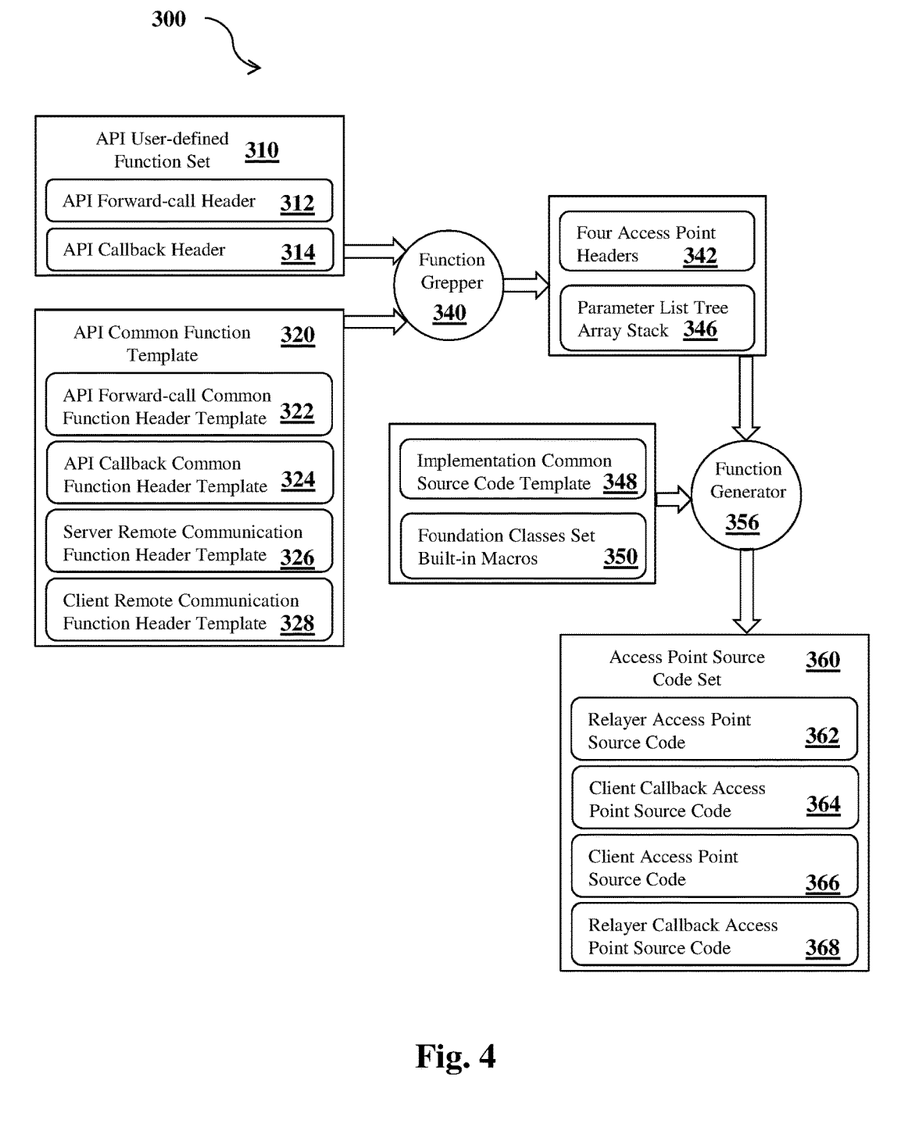
FIG. 4 illustrates a flow diagram of a compiler for generating source codes for access point instances, in accordance with various embodiments of the present disclosure.

FIG. 4 illustrates a flow diagram of a compiler for generating source codes for access point instances, in accordance with various examples of the present disclosure. A compiler takes input of an API user-defined function set 310 and generates output of an access point source code set 360. API user-defined function set 310 includes two header files, one is API forward-call header 312, and another is API callback header 314. In API forward call header 312, API user-defined forward-call class 222 is defined. Also in API callback header 314, API user-defined callback class 224 is defined. API user-defined function set 310 is the input a compiler needs from a programmer for further defining non-common API interface functions used in an application instance. The other inputs for the compiler are considered standard templates that can be commonly used for different applications to create access point instances. These standard templates include API common function template 320, implementation common source code template 348, and Foundation Classes Set built-in macros 350. API common function template 320 includes four header files, namely API forward-call common function header template 322 that defines API forward-call class 216, API callback common function header template 324 that defines API callback class 218, server remote communication function header template 326 that defines relayer remote communication class 204, and client remote communication function header template 328 that defines client remote communication class 206. Inheritance of a file refers to inheritance of a corresponding class defined in the file.

Still referring to FIG. 4, during compiling, a function grepper 340 first searches function names and function variables one by one from files of API user-defined function set 310 and API common function template 320. The search results of function names and function variables in use are stored in an internal data structure named parameter list tree array stack 346. Parameter list tree array stack 346 uses a tree structure for data storage. When function grepper 340 retrieves a child function called in a parent function, in the tree structure a branch of the child function is created from the trunk of the parent function. Meanwhile four access point headers 342 are created based on the double inheritance relationship described in FIG. 3. Then a function generator 356 starts to retrieve function source codes from an implementation common source code template 348 and Foundation Classes Set built-in macros 350, based on function names and function variables stored in parameter list tree array stack 346. The retrieving is in a regression sequence to make sure every parameter stored in the tree structure in parameter list tree array stack 346 will be retrieved. The corresponding function source codes are copied to create each access point source code in access point source code set 360. In an embodiment, implementation common source code template 348 and Foundation Classes Set built-in macros 350 include definition of serialization and deserialization procedures to process data packages.

There are four access point source codes in access point source code set 360, namely relayer access point source code 362, client callback access point source code 364, client access point source code 366, and relayer callback point source code 368. In the present embodiment, relayer access point source code 362 and client callback access point source code 364 are stored in memory 106 of server device 102. The execution of relayer access point source code 362 by processors 104 instantiates relayer access point instance 172 in an operating memory of memory 106. The execution of client callback access point source code 364 by processors 104 instantiates client callback access point instance 164 in an operating memory of memory 106. Client access point source code 366 and relayer callback access point source code 368 are stored in memory 106 of client device 112. The execution of client access point source code 366 by processors 114 instantiates client access point instance 162 in an operating memory of memory 116. The execution of relayer callback access point source code 368 by processors 114 instantiates relayer callback access point instance 164 in an operating memory of memory 116. In one embodiment, the whole access point source code set 360 is stored both in server device 102 and client device 112, as the roles of a server and a client may switch in some applications. As described in FIG. 3, due to inheritance relationships among classes, an access point instance has an inheritance from corresponding files in API user-defined function set 310 and API common function template 320, respectively.

Figure 5:
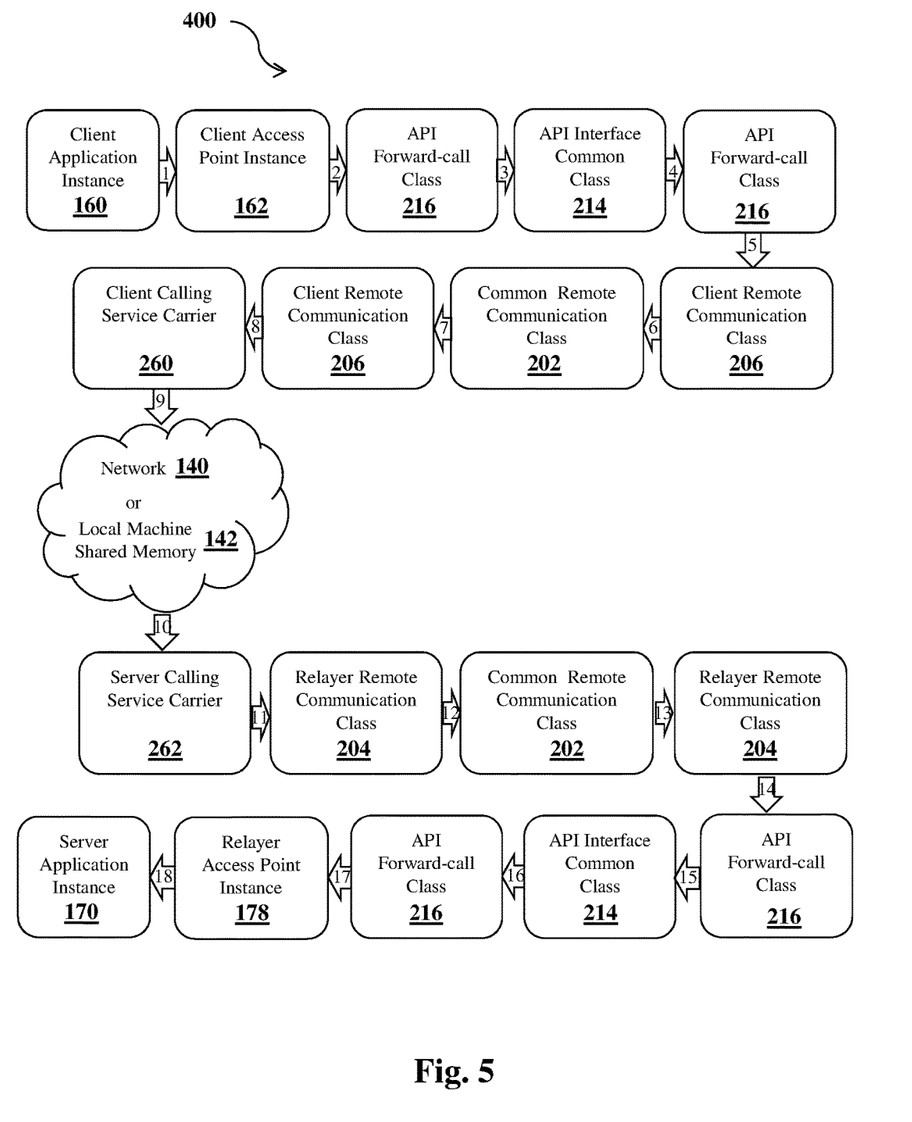
FIG. 5 illustrates a data flow diagram showing data flowing in a forward-call channel between a client device and a server device, in accordance with various embodiments of the present disclosure.

FIG. 5 illustrates a data flow diagram showing data flowing in a forward-call channel between a client device and a server device, in accordance with various embodiments of the present disclosure. In FIG. 5, arrows mark data flow directions. In a forward-call channel, data flow starts from client application instance 160. Client application instance 160 sends API requests through API interface to client access point instance 162. Since client access point instance 162 inherits its API interface functionality from API forward-call class 216, API requests are delivered to API forward-call class 216 to process. API forward-call class 216 first process common API functions used in API requests, by doing this API forward-call class 216 sends API requests to its parent class API interface common class 214. As API interface common class 214 is a root class defining common API functions, it first finishes processing the common API functions in API requests and then delivers back to API forward-class 216 to process specific functions related with API forward-call. Data flowing out of API forward-call class 216 is to be further processed for remote communication delivery. Client remote communication class 206 first process common remote communication functions, by doing this client remote communication class 206 sends API requests to its parent class common remote communication class 202. As common remote communication class 202 is a root class defining common remote communication functions, it finishes processing the common remote communication functions and returns API requests to client remote communication class 206. Client remote communication class 206 processes API requests with client end specific functions and passes data packages to client data carrier 260. Client data carrier 260 is responsible to send out data packages to a remote server device. Client data carrier 260 can also receive data packages sent from other devices.

Still referring to FIG. 5, server data carrier 262 receives data packages from network 140 or local machine shared memory 142. Relay remote communication class 204 first processes common remote communication functions, by doing this relayer remote communication class 204 sends API requests to its parent class common remote communication class 202, which processes the common remote communication functions and returns API requests to relayer communication class 204 to process server-end specific functions. After this, API requests are unpackaged and sent to API forward-class 216 for processing. API forward-call class 216 first processes common API functions used in API requests, by doing this API forward-call class 216 sends API requests to its parent class API interface common class 214. As API interface common class 214 is a root class defining common API functions, it processes common API functions in API requests and delivers API requests back to API forward-class 216 to process specific functions related with API forward-call. Relayer access point instance 178 as an instantiation of a child class of API forward-call class 216 sends the API requests to server application instance 170 through API interface.

As depicted in FIG. 5, data flows 2 to 17 are handled by the Foundation Class Set and the inherited access point instances. Client application instance 160 and server application instance 170 only see respective data flows 1 and 18. Therefore, remote API communication details are hidden from application instances. For client application instance 160 and server application instance 170, there is no differences between an RAPI function call and a local API function call. Besides, pointers can also be delivered between access point instances. In this way, any RAPI function call becomes a similarity to a local API function call, enabling direct function call between processes.

Figure 6A:
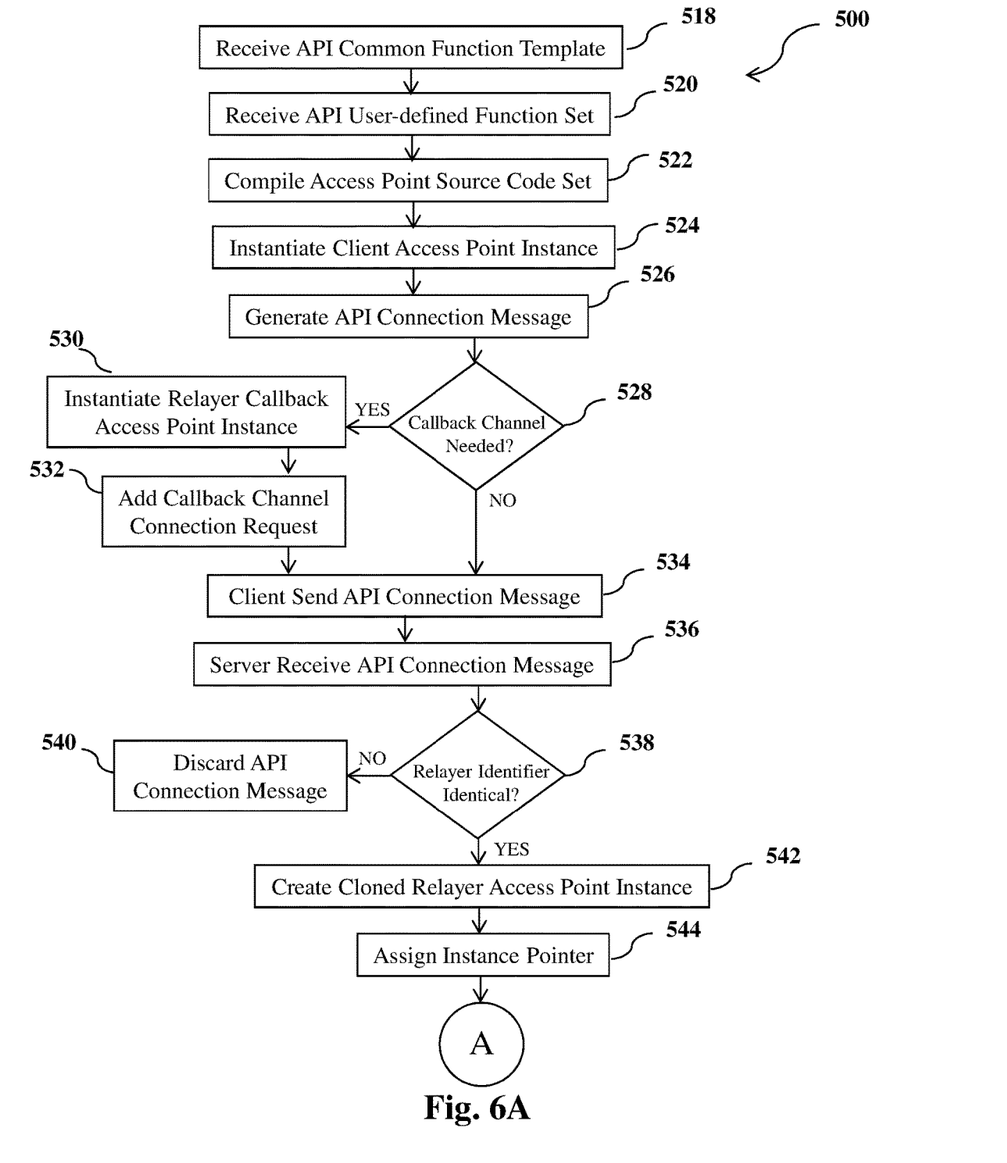
FIGS. 6A and 6B illustrate flow diagrams of a computer-implemented method for remote communication and remote programming, constructed in accordance with various embodiments of the present disclosure.
Figure 6B:
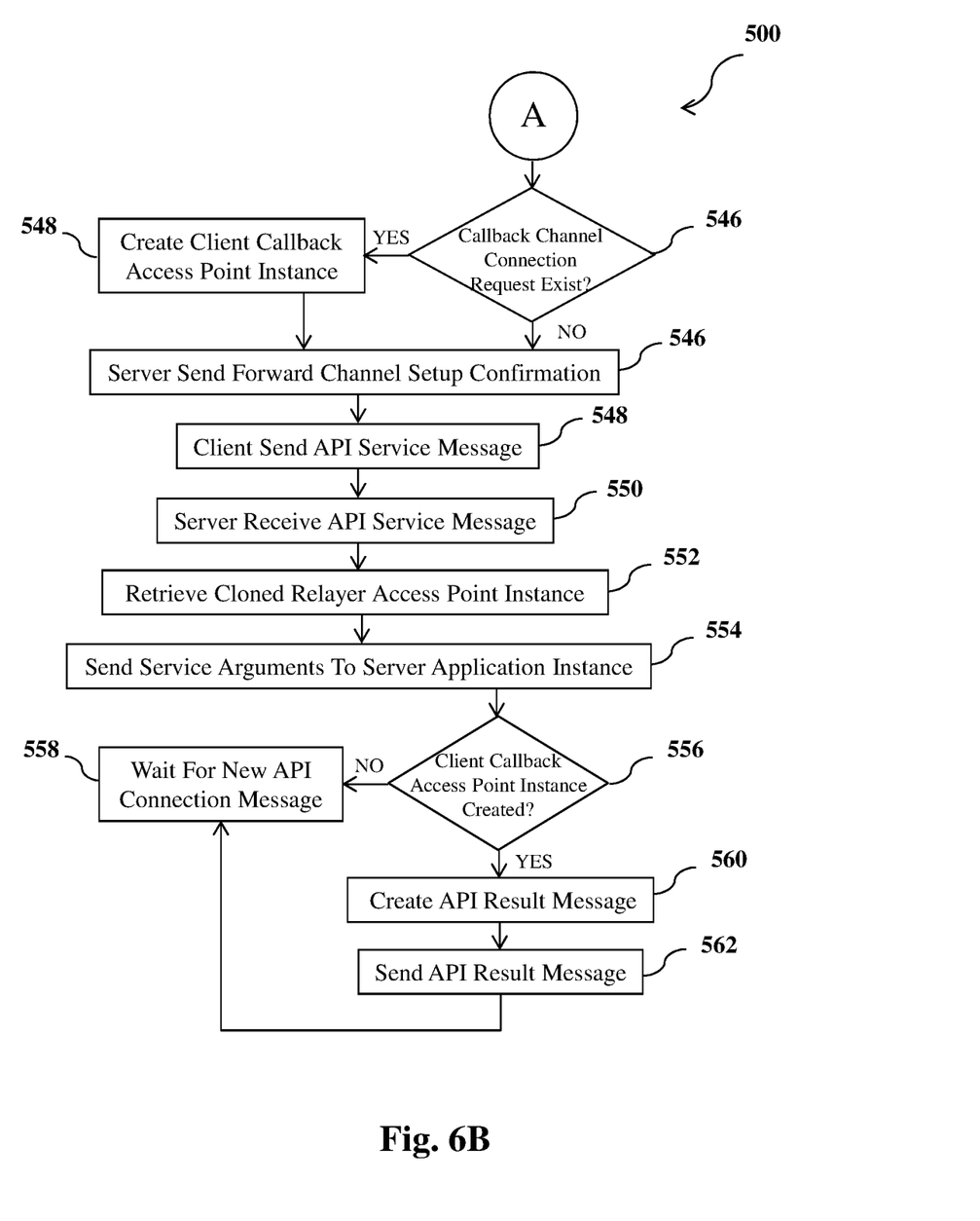

FIGS. 6A and 6B illustrate flow charts of a computer-implemented method 500 for remote API communication, constructed in accordance with some embodiments of the present disclosure. The method 500 is an example, and is not intended to limit the present disclosure beyond what is explicitly recited in claims. Additional operations can be provided before, during, and after the method 500, and some operations described can be replaced, eliminated, or relocated for additional embodiments of the method. For the purpose of illustration, the method 500 is described below in conjunction with FIGS. 2 and 3, wherein the method 500 is implemented in the system 100, in accordance with some embodiments.

Referring to FIG. 6A, at operation 518, method 500 receives API common Function Template 320. API common function template 320 includes four API common function header templates 322, 324, 326, 328. These four API common function header templates contain API forward-call class 216, API callback class 218, relayer remote communication class 204, and client remote communication class 206, respectively. API forward-call class 216 and API callback class 218 inherit from the same parent class, namely API interface common class 214 that defines API interface common functions. Relayer remote communication class 204 and client remote communication class 206 inherit from the same parent class, common remote communication class 202. At operation 520, the method 500 receives an API user-defined function set 310. API user-defined function set 310 includes API forward-call header 312 and API callback header 314. API forward-call header 312 contains definitions of API user-defined forward-call class 222 that includes application-specific API forward-call functions. API callback header 314 contains definitions of API user-defined callback class 224 that includes application-specific API callback functions. API user-defined forward-call class 222 is a child class of API forward-call class 216. API user-defined callback class 224 is a child class of API callback class 218.

At operation 522, method 500 creates access point source code set 360 by compiling API user-defined function set 310 and API common Function template 320. Access point source code set 360 includes access point source codes 362, 364, 366, and 368, which by execution create four access point instances. The compiling includes a procedure of class inheritance. Among the four access point instances, relayer access point instance 172 and client callback access point instance 176 are instantiated in server device 102; client access point instance 162 and relayer callback access point instance 164 are instantiated in client device 112. Relayer access point instance 172 is an instantiation of relayer forward-call access point class 232 that has a double inheritance from relayer remote communication class 204 and API user-defined forward-call class 222. Client callback access point instance 176 is an instantiation of client callback access point class 234 that has a double inheritance from client remote communication class 206 and API user-defined callback class 224. Client access point instance 162 is an instantiation of client forward-call access point class 236 that has a double inheritance from client remote communication class 206 and API user-defined forward-call class 222. Relayer callback access point instance 238 is an instantiation of relayer callback access point class 238 that has a double inheritance from relayer remote communication class 204 and API user-defined callback class 224.

At operation 524, method 500 instantiate client access point instance 162 by processors 114 executing client access point source code 366 in client device 112. At operation 526, client access point instance 162 generates an API connection message 184. API connection message 184 contains client identifier 166 and a relayer identifier read from a relayer identifier list 168 stored in client device 112's memory 116. Each relayer identifier stored in relayer identifier list 168 is uniquely associated with a server device.

Referring to FIG. 6A, at operation 528, method 500 checks whether client application instance 160 requires a callback channel. If callback channel is needed, method 500 moves to operation 530 by instantiating relayer callback access point instance 164 and at operation 532 to add callback channel connection request to API connection message 184. If callback channel is not needed, method 500 moves to operation 534.

At operation 534, client access point instance 162 sends out API connection message 184 to network 140. At operation 536, server device receives API connection message 184 by relayer access point instance 172 that has been instantiated by processors 104 by executing relayer access point source code 362 in memory 106 of server device 102. Relayer access point instance 172 is associated with a unique relayer identifier 180.

At operation 538, relayer access point instance 172 retrieves the relayer identifier from API connection message 184 and compares it with relayer identifier 180. If the received relayer identifier does not match relayer identifier 180, method 500 moves to operation 540 and discards API connection message 184. Relayer access point instance 172 then waits for new API connection messages. If the received relayer identifier matches relayer identifier 180, method 500 moves to operation 542 to create a cloned relayer access point instance 174 by duplicating relayer access point instance 172 in memory 106. Relayer access point instance 172 can also be called default relayer access point instance 172. In another embodiment, cloned relayer access point instance 174 is created by executing relayer access point source code 362 one more time in memory 106. Before creating cloned relayer access point instance 174, method 500 may first search instance array stack 178 to see whether cloned relayer access point instance 174 has already been created by an earlier API connection message. Cloned relayer access point instance 174 will handle future API requests received from first client device 112. By creating cloned relayer access point instances, server device 102 can process multiple API requests from different client devices. For example, by receiving an API connection message from second client device 122, a new cloned relayer access point instance can be assigned to client device 122. The procedure is similar to first client device 112. For simplicity, the method actions are not reiterated.

Referring to FIG. 6A, at operation 544, client identifier 166 is retrieved and an instance pointer 194 associated with client identifier 166 is created to point to cloned relayer access point instance 174. Instance pointer 194 is stored in instance array stack 178.

Referring to FIG. 6B, at operation 546, callback channel connection request is examined in API connection message 184. If there is callback channel connection request, method 500 moves to operation 548 by instantiating a client callback access point instance 176 by processors 104 executing client callback access point source code 364 in memory 106 of server device 102. If callback channel connection request is absent, method 500 moves to operation 546.

At operation 546, server device 102 sends forward channel setup confirmation to client device 112. At operation 548, client access point instance 162 sends out API service message 186. API service message 186 includes client identifier 166, at least an API function name, and a plurality of API function parameters. Since relayer forward-call access point class 232 and client forward-call access point class 236 both inherit from API user-defined forward-call class 222, they have the same API interface function list. For an API service to be requested, only an API function name, not the API function itself, needs to be delivered between client and server.

At operation 550, relayer access point instance 172 receives API service message 186. Method 500 moves to operation 552. Client identifier 166 is retrieved from API service message 186. Method 500 searches instance array stack 178 with client identifier 166 to retrieve instance pointer 194. With instance pointer 194, cloned relayer access point instance 174 is retrieved, which has been assigned to process API requests from client identifier 166. At operation 554, cloned relayer access point instance 174 sends the API function and a plurality of API function parameters through API interface to server application instance 170. Server application instance 170 processes API function and generates result.

At operation 556, method 500 checks whether client callback access point instance 176 has been created. If No, it means client device does not need a callback service. The current API service is considered completed. Server device 102 starts waiting for new API connection message. If client callback access point 176 has been created, server application instance 170 passes result of processing API function and its parameters to client callback access point instance 176. At operation 560, client callback access point instance 176 creates API result message 188. API result message 188 contains results corresponding to API service message 186 and client identifier 166. In one embodiment, API result message 188 also contains application instance identifier 182, or relayer identifier 180, or both. At operation 562, client callback access point instance 176 sends out API result message 188. Relayer callback access point instance 164 receives API result message 188 and checks client identifier 166 to decide whether to accept API result message 188. If API result message 188 is accepted, relayer callback access point instance 164 retrieves API service result from API result message 188 and passes through API interface to client application instance 160.

Some portions of the detailed description have been presented in terms of symbolic representations of operations on data bits within a memory. The operations are those requiring physical manipulations of physical quantities. Usually, though not necessarily, these quantities take the form of electrical or magnetic signals capable of being stored, transferred, combined, compared, and otherwise manipulated. Unless specifically stated otherwise as apparent from the following discussion, it is appreciated that throughout the description above, discussions utilizing terms such as "determining," "measuring," "generating," "setting," "performing," "computing," "comparing," "applying," "creating," "ranking," "classifying," and the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Not intended to be limiting, one or more embodiments of the present disclosure provide many benefits for remote communication and remote programming by API. First, API interface common functions and remote communication functions are included in a Foundation Classes Set that can be provided as a whole, such as in a .so software package to a programmer. A programmer is free from understanding nuance in RAPI communication, while can focus on defining two application specific API header files. A compiler will create access point source codes automatically from provided API header files and Foundation Classes Set. It reduces programming burdens for the programmer. Second, the RAPI method described in this disclosure is a distributed method. There is no need to register a central service register/manager to register all API services. Therefore, there is no concern of service requests jamming or service priority inversions that are often seen with central service register/manager mechanism. Third, remote function calls are handled by access point instances, while client application instance and server application instance see function calls as if local function calls and pointers can be passed in between. It makes direct function calls between different processes possible. Fourth, Foundation Classes Set is insensitive to different operating systems or platforms. A same .so software package can be used by different programmers to develop RAPI for different hardware devices. Its robustness meets the requirements of rapid developing IoT. Fifth, it provides device crashing recovery mechanism. Communication between client and server devices can be automatically restored. Sixth, systems according to the present disclosure enable a client-server model that allows multiple API calls simultaneously.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method for a server device to process an Application Programming Interface (API) request, comprising:
    receiving an API interface forward-call header and an API interface callback header;
    receiving a communication relayer header and a communication client header;
    constructing, within an operating memory of the server device, a default relayer access point instance, by executing a first code generated by compiling at least the API interface forward-call header and the communication relayer header, wherein the default relayer access point instance has a default relayer identifier;
    receiving, by the default relayer access point instance, an API connection message sent from a client networked to the server device, wherein the API connection message includes a relayer identifier;
    checking the relayer identifier; and
    on condition that the relayer identifier is identical to the default relayer identifier, performing the following action:
        creating a cloned relayer access point instance, by duplicating the default relayer access point instance within the operating memory;
        constructing, within the operating memory, a client callback access point instance, by executing a second code generated by compiling at least the API interface callback header and the communication client header, if the API connection message includes a callback channel connection request; and
        processing, by the cloned relayer access point instance, an API service message sent from the client.

2. The method of claim 1, wherein:
    the API interface forward-call header defines API forward-call functionalities;
    the API interface callback header defines API callback functionalities;
    the API interface forward-call header and the API interface callback header both inherit from a parent API interface class that defines common API interface functionalities;
    the communication relayer header defines remote communication functionalities on a server's end;
    the communication client header defines remote communication functionalities on a client's end; and
    the communication relayer header and the communication client header both inherit from a parent communication class that defines common communication functionalities.

3. The method of claim 1, wherein the API connection message includes a client identifier corresponding to the client, the method further comprising:
    after the creating of the cloned relayer access point instance, associating the cloned relayer access point instance with an instance pointer, wherein the instance pointer is stored in an instance array stack kept in a non-transitory memory of the server device and is retrievable with the client identifier.

4. The method of claim 3, wherein the API service message includes an API function name, a plurality of API function parameters, and the client identifier.

5. The method of claim 4, after the creating of the cloned relayer access point instance, further comprising:
    receiving, by the default relayer access point instance, the API service message;
    retrieving the instance pointer from the instance array stack with the client identifier read from the API service message;
    retrieving the cloned relayer access point instance pointed by the instance pointer; and
    passing, by the default relayer access point instance, the API service message to the cloned relayer access point instance.

6. The method of claim 1, wherein the processing further comprising:
    retrieving, by the cloned relayer access point instance, an API function name and a plurality of API function parameters from the API service message; and
    passing the API function name and the plurality of API function parameters to a server application instance associated with the cloned relayer access point instance.

7. The method of claim 6, on condition that the API connection message includes the callback channel connection request, after the processing of the API service message, the method further comprising:
    receiving, by the client callback access point instance, an API service result from the server application instance, wherein the API service result is associated with the API service message;
    creating, by the client callback access point instance, an API result message, wherein the API result message contains the API service result and the client identifier; and
    transmitting, by the client callback access point instance, the API result message to the client.

8. The method of claim 7, wherein the server application instance has an application instance identifier and the API result message contains the application instance identifier.

9. The method of claim 2, further comprising:
    receiving, by the default relayer access point instance, a second API connection message sent from a second client networked to the server device, wherein the second API connection message includes a second relayer identifier;
checking the second relayer identifier; and
on condition that the second relayer identifier is identical to the default relayer identifier, performing the following:
creating a second cloned relayer access point instance, by duplicating the default relayer access point instance within the operating memory; and
constructing, within the operating memory, a second client callback access point instance, if the second API connection message includes a second callback channel connection request.

10. A method for a client device to request an Application Programming Interface (API) service, comprising:
receiving an API interface forward-call header and an API interface callback header, wherein the the API interface forward-call header and the API interface callback header both inherit from a parent API interface class that defines common API interface functionalities;
receiving a communication relayer header and a communication client header, wherein the communication relayer header and the communication client header both inherit from a parent communication class that defines common communication functionalities;
constructing a client application instance within an operating memory of the client device;
constructing a client access point instance associated with the client application instance, within the operating memory, by executing a first code generated by compiling at least the API interface forward-call header and the communication client header;
retrieving a relayer identifier from a list of relayer identifiers stored in a non-transitory memory of the client device;
creating an API connection message, by the client access point instance, wherein the API connection message contains the relayer identifier;
transmitting the API connection message, by the client access point instance, to a server networked to the client device, wherein the server is associated with the relayer identifier; and
transmitting an API service message, by the client access point instance, wherein the API service message contains the relayer identifier.

11. The method of claim 10, wherein:
the API interface forward-call header defines API forward-call functionalities;
the API interface callback header defines API callback functionalities;
the communication relayer header defines remote communication functionalities on a server's end; and
the communication client header defines remote communication functionalities on a client's end.

12. The method of claim 11, wherein the client application instance is associated with a client identifier, and wherein the API connection message and the API service message both contain the client identifier.

13. The method of claim 11, further comprising:
constructing a relayer callback access point instance within the operating memory, by executing a second code generated by compiling the API interface callback header and the communication relayer header,
wherein the API connection message contains a callback channel connection request.

14. The method of claim 13, further comprising:
receiving, by the relayer callback access point instance, an API result message that contains an API result data and a first client identifier;
checking the first client identifier; and
on condition that the first client identifier is identical to a client identifier associated with the client application instance, performing the following action:
accepting the API result message; and
passing the API result data, by the relayer callback access point instance, to the client application instance.

15. The method of claim 14, wherein the API result message further contains a server application instance identifier, the server application instance identifier being associated with the server.

16. A method for an Application Programming Interface (API) communication between a server and a client, comprising:
receiving an interface user-defined function set including a first header file that defines API forward-call user-defined functions and a second header file that defines API callback user-defined functions;
receiving a common template set including a first template file that defines API forward-call common functions, a second template file that defines API callback common functions, a third template file that defines communication functions on a server's end, and a fourth template file that defines communication functions on a client's end;
compiling the interface user-defined function set with the common template set to create a default relayer access point instance, a client callback access point instance, a client access point instance, and a relayer callback access point instance, wherein the default relayer access point instance and the client callback access point instance are within a memory of the server, wherein the client access point instance and the relayer callback access point instance are within a memory of the client;
generating an API connection message by the client access point instance, wherein the API connection message includes a relayer identifier and a client identifier;
transmitting the API connection message to the server by the client access point instance;
receiving the API connection message by the default relayer access point instance;
checking the relayer identifier by the default relayer access point instance with a default relayer identifier associated with the default relayer access point instance; and
on condition that the relayer identifier is identical to the default relayer identifier, performing the following action:
creating a cloned relayer access point instance by duplicating the default relayer access point instance within the memory of the server;
associating the cloned relayer access point instance with the client identifier;
processing, by the cloned relayer access point instance, an API service message sent from the client access point instance, wherein the API service message contains an API function name and a plurality of API function parameters;
creating, by the client callback access point instance, an API result message, wherein the API result message is associated with the API function name and includes the client identifier; and transmitting, by the client callback access point instance, the API result message to the relayer callback access point instance.

17. The method of claim 16, wherein the first template file and the second template file both inherit from a first parent template file that defines API common functions, wherein the third template file and the fourth template file both inherit from a second parent template file that defines communication common functions.

18. The method of claim 17, wherein the first header file inherits from the first template file and the second header file inherits from the second template file.

19. The method of claim 18, wherein:

the default relayer access point instance has an inheritance from at least the first header file and the third template file;

the client callback access point instance has an inheritance from at least the second header file and the fourth template file;

the client access point instance has an inheritance from at least the first header file and the fourth template file; and the relayer callback access point instance has an inheritance from at least the second header file and the third template file.

20. The method of claim 16, further comprising:

associating the client callback access point instance with an instance pointer, wherein the instance pointer is stored in an instance array stack kept in a non-transitory memory of the server and is retrievable with the client identifier.

* * * * *